Patented Jan. 10, 1939

2,143,077

UNITED STATES PATENT OFFICE

2,143,077

LUMINESCENT MATERIAL

Humboldt W. Leverenz, Collingswood, N. J., assignor to Radio Corporation of America, a corporation of Delaware No Drawing. Application March 23, 1936, Serial No. 70,410

12 Claims. (Cl. 250—27.5)

This invention relates to a process for synthesizing luminescent materials and, in particular, is directed to producing luminescent materials of improved properties and with the further advantage that the spectral luminosity of the resultant material may be predetermined at the time of manufacture. This application is a continuation in part of applicant's co-pending application Serial No. 707,866, filed January 23, 1934, and entitled "Process for synthesizing luminescent material".

Luminescent materials, particularly those adapted to become excited under the influence of electric bombardment such as cathode ray beam and tubes used for television, oscillographs and allied uses have been known for some time by the commonly used luminescent materials known to the workers in the art, and always had the drawback of lacking consistent reproduction of their characteristic properties within close limits. For example, batches of luminescent material obtained at different times hithertofore from natural sources or from those synthesized in laboratories or factories would show different spectral emission characteristics due to an inability to produce materials having uniform characteristics.

The present invention is, therefore, concerned with a new method and means for producing new luminescent materials which will have reproducable characteristics so that a batch manufactured on one day will have identical characteristics with that of a batch manufactured on another day. Further than this, my improved luminescent material has the properties of exhibiting great resistance to burning, invariant spectral distribution, and a wide band spectral distribution. It will be readily appreciated, therefore, that this new luminescent material has many qualities which make it extremely desirable for use in cathode ray tubes, for example.

My present invention relates to a process for producing and/or preparing a luminescent material possessing the above characteristics. In addition, the process of manufacture results in the production of a luminescent material wherein the very valuable property of controlled spectral emission is established by the process of manufacture. In the past, luminescent materials have had a characteristic spectral distribution which was solely a function of the elements making up the material and in this respect the color of the emitted luminosity under cathode ray bombardment was fixed.

By my invention I have developed a luminescent material wherein it is possible to control the color of the emitted light over a wide spectral range, by merely changing the proportions of the elements entering into the composition of the final material and/or the final heating temperatures of the material.

Accordingly, it is one of the purposes of my invention to provide a luminescent material whose spectral emission may be changed from one end of the spectrum to the other through all the intermediate positions thereof by changing the proportions of the materials entering into the synthesis of the finally prepared luminescent material.

Likewise it is one of the purposes of my invention to provide a luminescent material whose spectral emission may be changed from one end of the spectrum to the other through all the intermediate positions thereof, by controlling the temperature and duration of the heating of the luminescent product during its preparation.

A further object of my invention is to shift the emission spectrum from the violet and toward longer wave lengths up to and including the red end by isomorphic mutual replacements in the crystal lattice of the luminescent material.

Another object of my invention is to prepare a material which will emit light of high intensity under cathode ray bombardment.

A still further object of my invention is to provide a process for synthesizing a luminescent material with invariant spectral distribution with regard to length of time of cathode ray bombardment.

Another object of my invention is to prepare a material which will produce the effect of emitting white light under high intensity cathode ray bombardment. This is accomplished by providing a luminescent material whose emission spectrum characteristic is such that when taken in conjunction with the spectral response characteristic of the human eye, the over-all characteristic is one of constant sensatory response over substantially the whole visible spectrum.

A still further object of my invention is to provide a process whereby improved luminescent materials may be prepared with minimum expense but, nevertheless possess the advantage of uniformly superior response characteristics.

Other objects and advantages of my invention will be immediately apparent to those skilled in the art upon reading the following description of my invention.

The luminescent material resulting from my invention is a crystalline structure comprising zinc ortho-silicate and cadmium meta-silicate activated by manganese. It should be clearly understood that this is not a mixture of zinc-ortho-silicate and cadmium meta silicate in the usual chemical sense, but actually is an homogeneous crystal comprising manganese, zinc ortho-silicate, and cadmium meta-silicate in a single crystal lattice structure. In this material the ratio between the zinc ortho-silicate and the cadmium meta-silicate may be varied from 10,000 to 1 to 1 to 10,000. Thus a formula which is descriptive of a luminescent material possessing the above outlined characteristics may be expressed as $x(Zn_2SiO_4)y(CdSiO_3).Mn$. In this formula the variables $x$ and $y$ may be such that $x/y$ may be varied from 10,000 to 1 to 1/10,000. The amount of manganese is approximately 0.006 molal with respect to the total metallic ion molality, but may be varied within wide limits; for example, between the values of 0.1 molal to 0.0001 molal to alter the resultant intensity and color of my improved luminescent material.

It may be pointed out at this point that beryllium may be substituted in part or in whole for zinc in the above formula in accordance with the method and means described in my co-pending application entitled "Luminescent materials" Serial No. 66,453, filed September 29, 1936, now Patent Number 2,118,091, issued May 24, 1938.

Likewise germanium may be substituted for silicon in part or in whole, as explained and described in my co-pending application Serial No. 707,866, filed January 23, 1934, entitled "Process for synthesizing luminescent materials".

The steps in the process of mixing, precipitating, heating, and finally grinding the luminescent material as in a ball-mill, for example, have already been described in detail by my co-pending application Serial No. 707,866, filed January 23, 1934, in which I have described the preparation of a manganese activated ortho-silicate. The essential differences between the preparation of this material and that described in the above mentioned co-pending application is that in the preparation of my manganese activated zinc ortho-silicate-cadmium meta silicate material, exceedingly pure zinc nitrate and cadmium nitrate solutions are added to very finely divided silicon dioxide in suspension as, for example, colloidal silicon dioxide, in proper proportion, as specified by the above mentioned conditions to be met with regard to $x$ and $y$, in contra-distinction to the use only of zinc nitrate. The mixture is heated and stirred and when brought to a boil, there is added very slowly and carefully with plenty of agitation saturated ammonium carbonate solution of great purity and in sufficient quantity to precipitate the metallic salts as carbonates on the finely divided silicon dioxide. The contents of the beaker are then evaporated with stirring to dryness and then heated by any appropriate manner to red heat. The contents are then allowed to cool and are ground and mixed with a quartz rod. The resultant product is then placed in a quartz crucible and a suitable quantity of manganese nitrate solution of the greatest purity obtainable is added, the exact quantity ranging between 0.1 and 0.0001 molal with respect to the total cation molality depending on the actual spectral emission distribution desired.

Quartz distilled water is then added to the amount to make the mixture thoroughly wet. The crucible is then heated and the contents thereof stirred until brought to a boil, whereupon concentrated ammonium carbonate is added to precipitate the manganese, in the form of manganese carbonate upon ortho-meta salt nuclii. The contents of this crucible are then evaporated with stirring to dryness and upon cooling the contents are ground with a quartz rod. The contents are then transferred to a covered platinum crucible and heated to between 700° and 1500° C. in an electric furnace, for example. It has been found by experience that the optimum temperature lies between 900° and 1000° C. and the heating time is preferably on the order of an hour. The final product is a lightly fritted, easily commutable white cake, which gives intense cathode luminescence, whose color depends upon the actual ratio between the zinc ortho-silicate and cadmium meta-silicate. For a ratio of unity between these two materials and under high intensity electron bombardment, the emitted light appears white. It will be appreciated, of course, that by changing the ratio of the zinc-ortho-silicate to the cadmium meta-silicate, the color may be varied from the normal green blue of pure manganese activated zinc ortho-silicate to normal yellow orange of pure manganese activated cadmium meta-silicate. Other changes in the spectral emission spectrum may be had by changing the amount of manganese or by controlling the temperature to which the product is heated, or by controlling the length of time that the material is heated.

I may further modify and/or control the emission spectrum characteristic by means of high-temperature quenching as described in my co-pending application, Serial No. 59,883, filed January 20, 1936 entitled "Luminescent materials". By means of high temperature quenching the lattice structure of my improved crystalline material may be expanded with a consequent shift in the emission spectrum toward the longer wave lengths. As a result of this, additional advantages accrue to my materials and methods, since it is possible to utilize a single prepared batch of material for purposes requiring different spectral emission characteristics by the additional step of high-temperature quenching.

In this process it will be noted that no halides and, in particular, no fluorides are used in the process of preparing the composition. Consequently, the necessity for providing platinum ware for use in preparation of my improved luminescent material is unnecessary. Therefore, it is readily seen that the cost of preparing such materials is materially reduced. It will be apparent from the foregoing that this composition of material described by the present invention, in addition to the property of having controlled spectral range, possesses the other desirable features of manganese activated zinc ortho-silicate, which have been enumerated in my co-pending application, referred to above, among which are high efficient emitting light of high intensity under cathode ray bombardment possessing an invariant spectral distribution with regard to the length of time of cathode ray bombardment, which has cheapness of preparation, controllable spectral emission, and precise spectral emission characteristics controlled by temperature and heating process.

Consequently, my improved process and material have made possible the production of television pictures of improved quality by providing a material which can be coated on the end wall of a cathode ray tube upon which the electro-optical representation is produced, since the color of the resulting luminescence may be controlled to give a white color of high intensity.

It will be readily appreciated that reconstructed images on the end wall of the cathode ray tubes in white color are preferable to the usual bluish green image, since people are accustomed to black and white pictures, and my new and improved material affords a practical realization of this ideal, whereas the bluish green images produced by prior known phosphors are wide of the mark in this respect.

If it is desired to accentuate any one part of the spectrum, the manganese activated zinc ortho-silicate-cadmium meta silicate spectral emission may be peaked in the desired region either by heat treatment or by choosing the suitable proportions between cadmium and zinc, or the activator manganese. If it is desired to increase the secondary emission of this material, the manganese activated zinc ortho-silicate-cadmium meta silicate which I have described, may be mixed with small amounts of barium, strontium, calcium, caesium, rubidium, lanthanum, cerium, thorium, any of their compounds, or other elements or their compounds, which have large ionic or atomic radii. In certain applications of luminescent material, it is desirable to have high secondary emission and by mixing small amounts of the above identified materials, this desirable feature can be readily obtained.

Having now described my invention, what I claim is:

1. A crystalline luminescent material which is represented by the general formula $$x(A_2BO_4) \cdot y(CdBO_3) \cdot Mn$$

where A is a metal in the second series of the second group of the periodic system, B is an element in the second series of the fourth group, and $x/y$ may be varied from 1/10000 to 10000/1.

2. A luminescent material consisting of manganese activated beryllium ortho-cadmium meta salt of an element of the fourth group of the periodic series.

3. A luminescent material consisting of manganese activated beryllium ortho-silicate-cadmium meta silicate.

4. A luminescent material consisting of manganese activated beryllium ortho-germanate cadmium meta germanate.

5. A luminescent material consisting of manganese activated zinc ortho-cadmium meta salt of an element of the fourth group of the periodic series.

6. A luminescent material consisting of manganese activated zinc ortho-cadmium meta salt of an element of the second series of the fourth group of the periodic series.

7. A luminescent material consisting of manganese activated zinc ortho-silicate-cadmium meta silicate.

8. A luminescent material consisting of manganese activated zinc ortho-germanate-cadmium meta-germanate.

9. A luminous coating within an envelope for an electron discharge device comprising manganese activated zinc ortho-cadmium meta salt of an element in the fourth group of the periodic series.

10. A luminescent screen comprising manganese activated zinc ortho-cadmium meta salt of an element in the second series of the fourth group of the periodic series.

11. In an electron discharge device a luminescent screen comprising manganese activated zinc silicate cadmium meta silicate.

12. A composition of matter having incorporated therein manganese activated zinc ortho-germanate-cadmium meta germanate.

HUMBOLDT W. LEVERENZ.